United States Patent
Iizuka

[11] Patent Number: 6,084,543
[45] Date of Patent: Jul. 4, 2000

[54] ROUTE GUIDE APPARATUS

[75] Inventor: Katsuya Iizuka, Himeji, Japan

[73] Assignee: Fujitsu Ten Limited, Hyogo, Japan

[21] Appl. No.: 09/052,024

[22] Filed: Mar. 31, 1998

[30] Foreign Application Priority Data

Mar. 31, 1997 [JP] Japan ................................ 9-081179

[51] Int. Cl.⁷ .............................. H04B 7/185; G01S 5/02
[52] U.S. Cl. .................... 342/357.13; 701/205; 701/209; 701/211
[58] Field of Search ..................... 342/357.13; 340/990, 340/995; 701/211, 202, 205, 209

[56] References Cited

U.S. PATENT DOCUMENTS 5,926,118  7/1999  Hayashida et al. ..................... 340/995

FOREIGN PATENT DOCUMENTS

| 06068386A | 3/1994 | Japan . |
| 07035559A | 2/1995 | Japan . |
| 07049243A | 2/1995 | Japan . |
| 07103776A | 4/1995 | Japan . |
| 9-101169  | 4/1997 | Japan . |
| 9-120499  | 5/1997 | Japan . |

*Primary Examiner*—Theodore M. Blum
*Attorney, Agent, or Firm*—Wenderoth, Lind & Ponack, L.L.P.

[57] ABSTRACT

A route guide apparatus is disclosed, in order to supply guidance at a guide point along a guide route before reaching the guide point in an easy-to-understand fashion. Guide routes are displayed along roads in map data displays and the number of traffic lights existing between a vehicle position and the guide point where the direction is to be changed is displayed or indicated by voice. Such phases as "Turn at fourth traffic light" or "Turn after passing third traffic light" are displayed on the map displays or indicated by voice. A traffic light icon, if displayed, can facilitate the determination of the presence or absence of a traffic light at the intersections and the guide point.

20 Claims, 4 Drawing Sheets

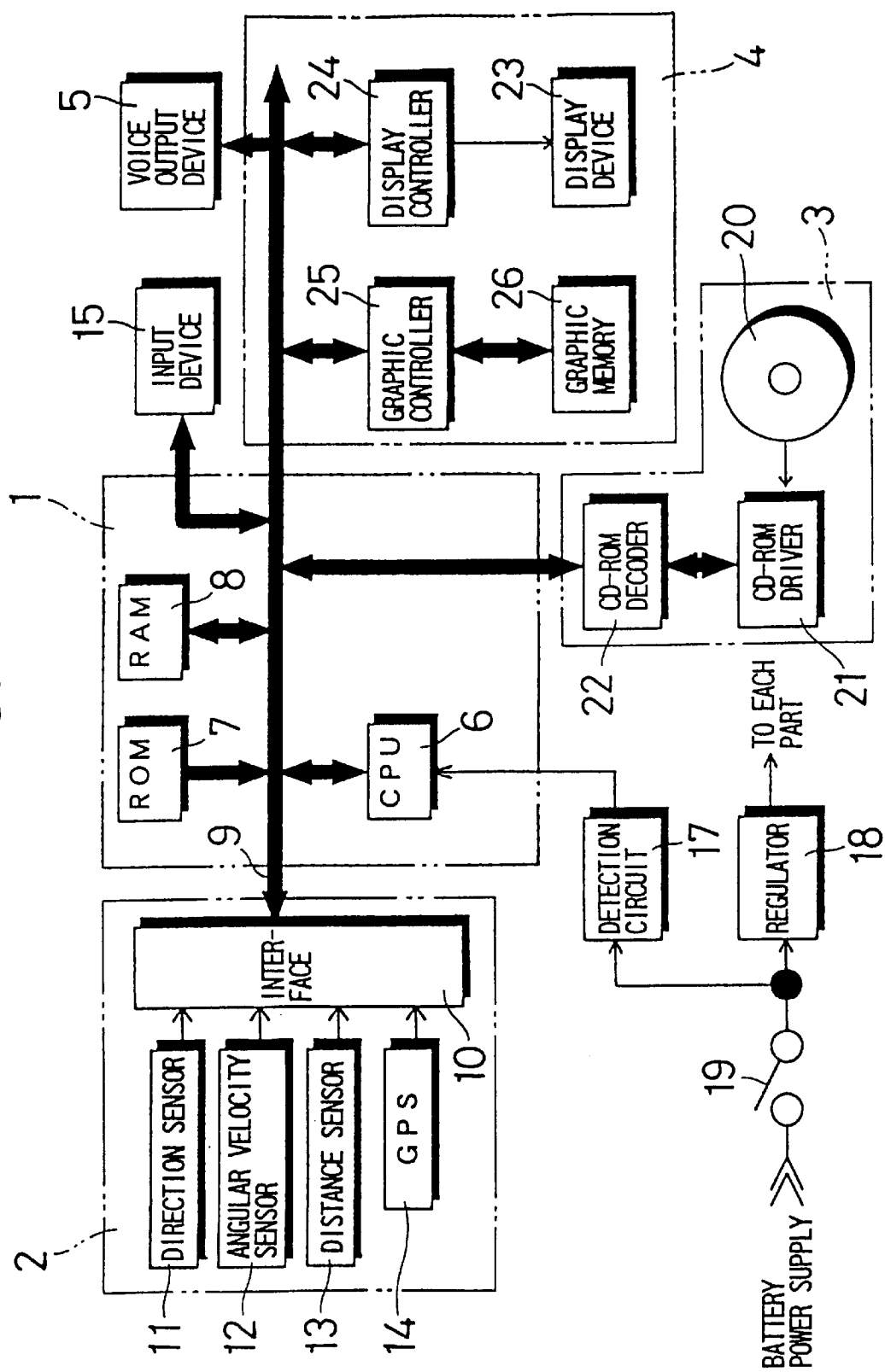

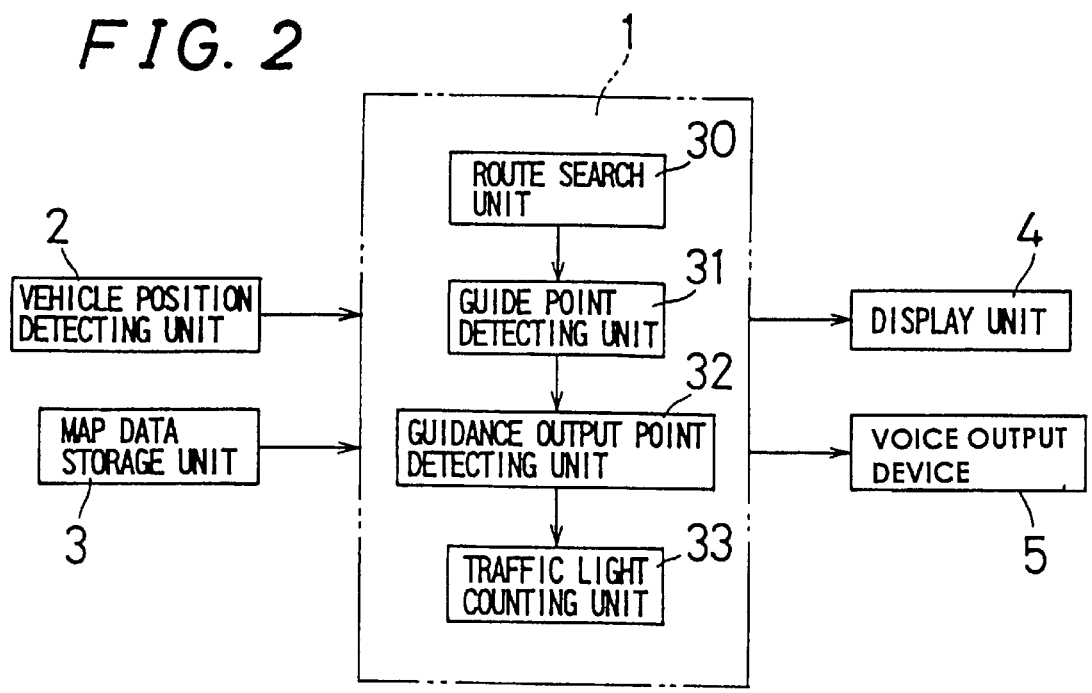
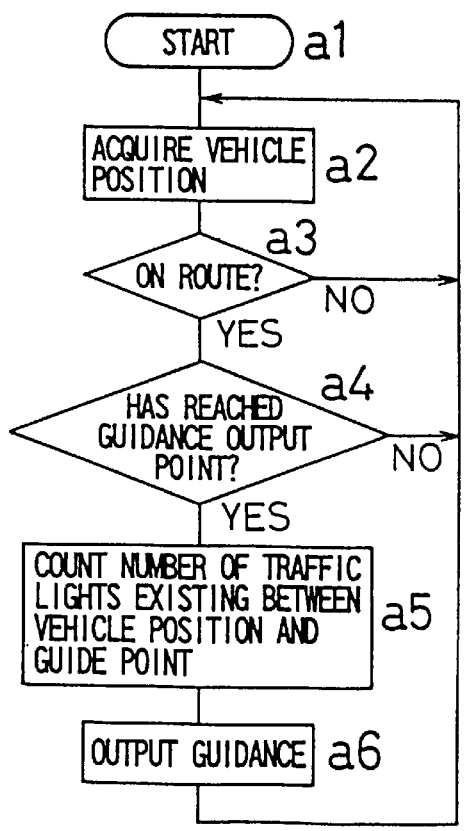

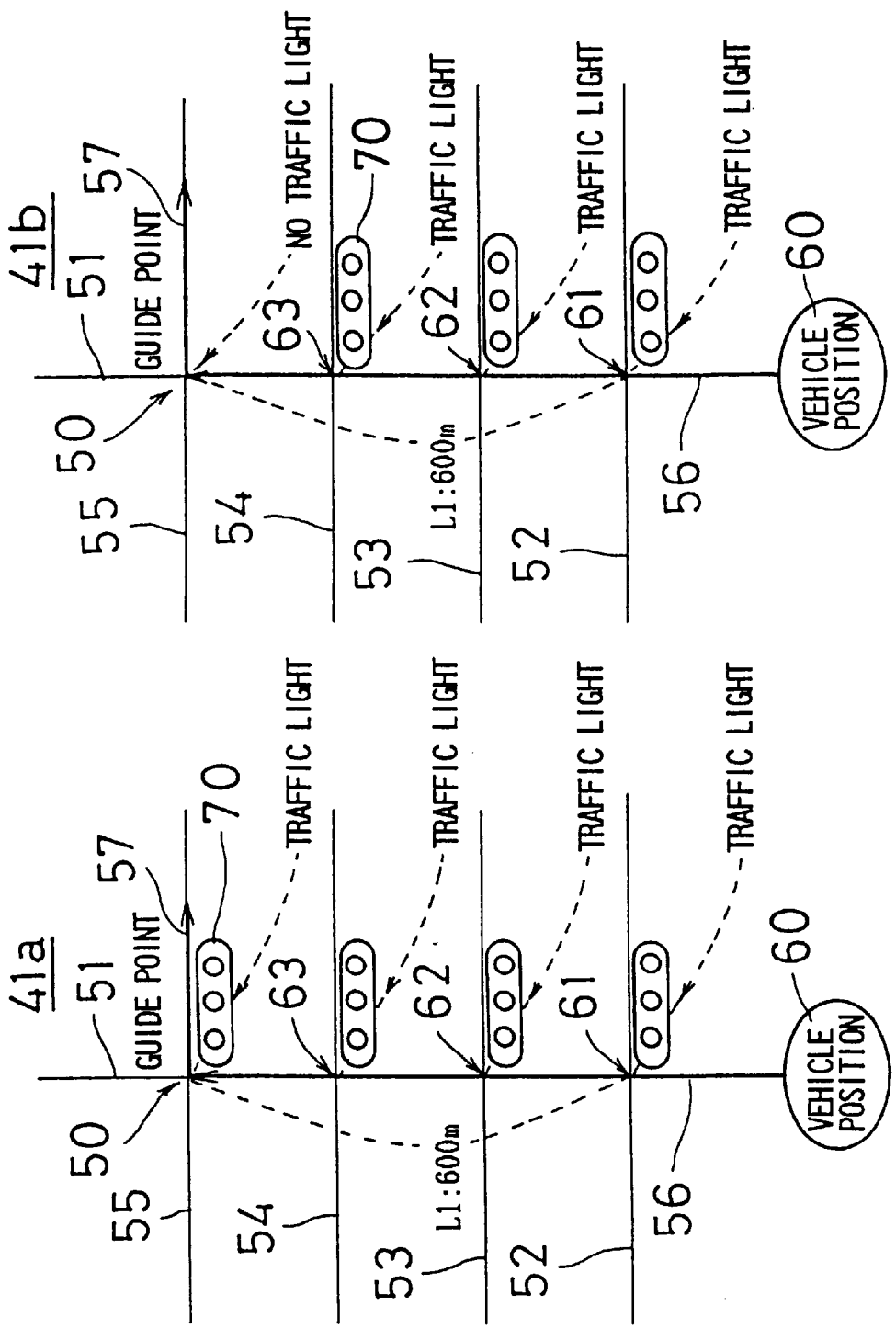

ROUTE GUIDE APPARATUS

BACKGROUND OF THE INVENTION

1. Field of the Invention

The present invention relates to a route guide apparatus such as a navigation system and the like, mounted on a vehicle such as an automobile.

2. Description of the Related Art

Many conventional navigation systems have a route search function for searching for a route leading to a destination based on the road network information to minimize the distance to be covered and the time required, and displaying results of the search on a display unit together with a road map. Guide points, such as intersections at which the traveling direction is to be changed, are indicated along the guide route thus searched, so that a vehicle passing a given guide point is informed in more detail than at other points.

In order to guide the running vehicle smoothly, it is necessary to supply a guidance at each guide point before the vehicle reaches the particular guide point. This is because the vehicle may be required to turn at an intersection, for example, and must change the lane and decelerate before reaching the intersection. On the other hand, in urban areas, roads are so densely built that a guide point such as an intersection, even if the vehicle driver is informed of it before the guide point, often cannot be identified easily. A technique for supplying a guidance at a point back from a predetermined intersection along a guide route is disclosed in Japanese Unexamined Patent Publications JP-A-7-49243 (1995) and JP-A-7-103776 (1995), in which "the distance to be covered before reaching an intersection at which to turn" and "the number of intersections to be passed before reaching an intersection at which to turn", respectively, are announced by voice.

In running through an area where roads are densly-built, the driver may often find it difficult to recognize an intersection of a guide point, if the intersection has been identified exclusively by a distance to be covered before reaching the intersection, as in the prior art of Japanese Unexamined Patent Publication JP-A 7-49243 (1995). This is because densely-built roads and a great number of intersections makes it necessary to change traveling speeds frequently, making ir difficult to judge the distance grasping the sense of distance. On the other hand, in Japanese Unexamined Patent Publication JP-A 7-103776 (1995), when roads are congested with traffic or the like, it is difficult for the driver informed of the number of intersections to recognize each intersection visually. In many such cases, the driver has no choice but to recognize each intersection by viewing a traffic signal such as a traffic light provided at the intersection. However, not every intersection is not provided with a traffic light. In the case where the number of traffic lights is not consistent with the number of intersections, the driver may not be correctly informed of the location of the guide points.

There exist other Japanese Unexamined Patent Publications JP-A 6-68386 (1994) and JP-A 7-35559 (1995), in which traffic signals are displayed on a road map for guiding the driver along a route. In Japanese Unexamined Publication JP-A 6-68386, it is suggested that a route guidance may be announced by voice, but it is not suggested to supply a guidance before a particular guide point. In Japanese Unexamined Publication JP-A 7-35559, traffic signals are displayed on a route map with other items so that it could be very difficult for a driver to count the number of traffic signals existing on the route driving.

SUMMARY OF THE INVENTION

The object of the present invention is to provide a route guide apparatus capable of informing a vehicle driver of guide points set along a guide route in advance in an easy-to-understand way.

The invention provides a route guide apparatus mounted on a vehicle, for supplying guidance on a travel route for a guide point which is set on a predetermined guide route, while detecting a vehicle position and referring to road network information stored beforehand, the route guide apparatus comprising:

a guidance output point detecting unit for detecting whether or not the vehicle position has reached a guidance output point set before the guide point on the guide route;

a traffic light counting unit for counting the number of traffic lights existing along the guide route from the vehicle position to the guide point with reference to the road network information and the information as to the presence or absence of traffic light on the guide route; and a guidance output unit for supplying, in response to a detection output from the guidance output point detecting unit, the guidance for the guide point using the number of traffic lights counted by the traffic light counting unit when the vehicle position reaches the guidance output point.

According to the invention, when the vehicle position reaches the guidance output point, the traffic light counting unit counts the number of traffic lights existing along the guide route between the vehicle position and the related guide point with reference to the road network information. As the guidance output unit gives a guidance for a related guide point using the number of traffic lights counted, a driver of the vehicle can recognize the particular guide point easily by counting the number of traffic lights.

According to the invention, as the guidance on the guide point is supplied using the number of traffic lights, the driver of the vehicle can reach the guide point without fail by counting the traffic lights, which can be easily recognized.

The invention is further characterized in that:

the road network information is stored in the form of a set of nodes representing coordinate points and links connecting the nodes, and the route guide apparatus further comprises:

a display unit for displaying a road map based on the road network information and the vehicle position in relation to each other; and a route search unit for searching for a route to a destination with reference to the road network information in accordance with a predetermined condition.

According to the invention, it is possible to give a well-recognizable route guidance at a guide point along the guide route which is searched by the route search unit based on the predetermined condition and with reference to the road network information, by using the number of traffic lights.

According to the invention, it is possible to give a guidance easily recognized by the driver by displaying the number of traffic lights.

The invention is further characterized in that the guidance output point detecting unit detects that the vehicle has reached the guidance output point based on a distance to the guide point.

According to the invention, once a distance from a guidance output point to a related guide point is set, the guidance output point can easily detect whether or not the vehicle position has reached a position within the set distance from the guide point with reference to the road network information.

According to the invention, once a distance from a guidance output point to a related guide point is set, whether or not the vehicle position has reached the guidance output point can be easily detected.

The invention is characterized in that the guidance output point detecting unit detects that the vehicle has reached the guidance output point based on an estimated time length to reach the guide point.

According to the invention, once an estimated time length to reach a guide point from a related guidance output point is set, the guidance output point detecting unit can easily detect whether or not the vehicle position has reached the guidance output point corresponding to the, thus set, estimated time length, based on the distance between the vehicle position and the guide point and the traveling speed of the vehicle with reference to the road network information.

According to the invention, once an estimated time length to reach a guide point from a related guidance output point is set, whether or not the vehicle position has reached the guidance output point corresponding to the, thus set, estimated time length can be easily detected.

The invention is further characterized in that the guidance output unit indicates of the number of traffic lights up to the guide point by displaying with an image.

According to the invention, the number of traffic lights existing prior to reaching a guide point is displayed as an image. The number of traffic lights can be displayed as a numerical value, an icon, etc., a form that can be easily understood.

According to the invention, the number of traffic lights existing before reaching a guide point is displayed as an image, so that a guidance exists which can be easily understood by a driver.

The invention is characterized in that a guidance output unit indicates the number of traffic lights prior art before reaching the guide point by voice.

According to the invention, the vehicle driver recognizes the number of traffic lights indicated by voice guidance, and, therefore, the driver can continue to drive safely along the guide route without looking away.

According to the invention, the driver receives the guidance as to the number of traffic lights audibly and, therefore, the driver can safely continue to drive along the guide route without looking away.

The route guide apparatus of the invention further comprises a distance detecting unit for detecting a distance from the guidance output point to the guide point, which is characterized in that the guidance output unit supplies a guidance while including the distance to the guide point detected by the distance detecting unit to the information in the guidance.

According to the invention, the information including the distance from the guidance output point to the guide point and the number of traffic lights to be passed before reaching the guide point can be obtained as guide information. Therefore, the driver can determined with a higher accuracy, a point to which the vehicle is guided by the guide information.

According to the invention, the driver can determine the point to which the given guidance is related with a higher accuracy based on the distance and the number of traffic lights to be covered before reaching the guide point, and, therefore, the driver can easily drive to the guide point.

The route guide apparatus of the invention further comprises a guide information detecting unit for detecting guide information at the guide point, and is characterized in that the guidance output unit gives a guidance at the guidance output point while including the guide information detected by the guide information detecting unit to the guidance.

According to the invention, the guidance output unit includes the guide information at the guide point detected by the guide information detecting unit. The driver, therefore, can intuitively determine the direction he should take at a given point and, thus, can safely continue to drive.

According to the invention, since the guidance includes the guide information at the guide point in addition to the number of traffic lights, the driver can intuitively determine the direction he should take at the guide point and can, thus, safely continue to drive.

The route guide apparatus further comprises a setting unit for presetting a condition for detecting a guidance output point by the guidance output point detecting unit and a method for outputting the guidance by the guidance output unit.

According to the invention, the condition for detecting a guidance output point and a method for outputting the guidance can be preset in the setting unit in accordance with the driver's requirement, and the driver can be supplied with a route guidance including the number of traffic lights in accordance with the preset contents.

According to the invention, the driver can be supplied with a drive guidance which is easy-to-understand in accordance with set contents for the detecting condition of a guidance output point and the method for outputting a guidance.

The invention further provides a route guide apparatus mounted on a vehicle, for supplying a guidance on a travel route for a guide point which is set on a predetermined guide route, while detecting a vehicle position and referring to road network information stored beforehand, the route guide apparatus comprising:

a traffic light counting unit for counting the number of traffic lights existing along the guide route from the vehicle position to the guide point with reference to the road network information and the information as to the presence or absence of traffic light on the guide route;

a guidance output point detecting unit for detecting whether or not the vehicle position has reached a guidance output point set before the guide point by a predetermined number of traffic lights, based on the number of traffic lights counted by the traffic light counting unit; and a guidance output unit for supplying, in response to a detection output from the guidance output point detecting unit, the a guidance for the guide point using the number of traffic lights when the vehicle position reaches the guidance output point.

According to the invention, the traffic light counting unit counts the number of traffic lights existing along the guide route between the vehicle position and the guide point, with reference to the road network information and the information as to presence or absence of a traffic light at each intersection. When the count of traffic lights reaches the predetermined number before the guide point, the guidance output point detecting unit detects that the vehicle position has reached the guidance output point, and the guidance output unit outputs a guidance on the guide point using the number of traffic lights. In view that a guide point is recognized by using the number of traffic lights set in advance, the same number of traffic lights can always be associated with the guide point, thereby facilitating the recognition of the guide point.

According to the invention, when the number of traffic lights has reached the predetermined number before the guide point, it is detected that the vehicle has reached the guidance output point. Since a guide point is recognized by a preset number of traffic lights, the same number of traffic lights can always be connected with a guide point, thereby making it possible to determine the number of traffic lights to be passed before reaching the guide point.

BRIEF DESCRIPTION OF THE DRAWINGS

Other and further objects, features, and advantages of the invention will be more explicit f rom the f ollowing detailed description taken with reference to the drawings wherein:

FIG. 1 is a block diagram showing an electrical configuration of an embodiment according to the invention;

FIG. 2 is a block diagram showing a system configuration according to the embodiment shown in FIG. 1;

FIG. 3 is a flowchart showing the operation of the embodiment of FIG. 1;

FIGS. 5A and 5B are diagrams showing examples of a map display displayed in FIG. 4.

DETAILED DESCRIPTION OF THE PREFERRED EMBODIMENTS

Figure 4:
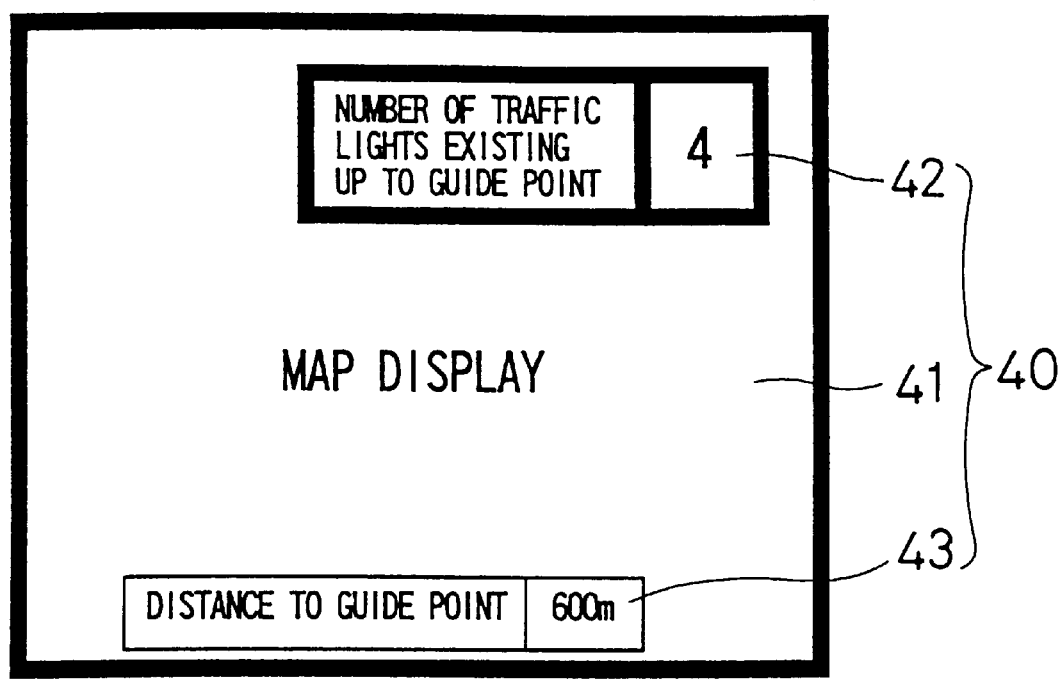
FIG. 4 is a diagram showing an example of a display guide screen according to the embodiment of FIG. 1.

Now referring to the drawings, preferred embodiments of the invention are described below.

FIG. 1 schematically shows an electrical hardware configuration of a of a route guide apparatus according to an embodiment of the invention. The route guide apparatus according to this embodiment is mounted on a vehicle such as an automobile, and performs the fundamental functions as a navigation system based on a programmed operation of a processing unit 1. As a navigation system, the route guide apparatus has functions of: detecting a vehicle position which is a current position of vehicle by a vehicle position detecting unit 2; displaying the vehicle position together with map data stored beforehand in a map data storage unit 3, and providing a route guidance by voice with the use of voice output device 5. The processing unit 1 includes a CPU 6, a ROM 7 and a RAM 8. The CPU 6 performs functions of a navigation system while storing data or the like, temporarily in the RAM 8 in accordance with the program stored beforehand in the ROM 7.

The vehicle position detecting unit 2 includes an interface 10 connected through a system bus line 9 to the CPU 6, the ROM 7 and the RAM 8 of the processing unit 1 and further to the map data memory 3, a display unit 4 and a voice output device 5. The interface 10 is also connected to a direction sensor 11, an angular velocity sensor 12, a distance sensor 13 and a GPS device 14. The direction sensor 11 detects the traveling direction of the vehicle as an absolute direction based on the earth magnetism or the like. The angular velocity sensor 12 detects the angular velocity associated with the change in the traveling direction of the vehicle as a vibration component of a vibration gyro on which the Coriolis' force acts. The distance sensor 13 measures the traveling distance of the vehicle based on a vehicle speed pulse counting value corresponding to the rotational speed of the vehicle's wheels.

By combining the traveling direction detected by the direction sensor 11 or the change in the traveling direction of the vehicle detected by the angular velocity sensor 12, with the traveling distance detected by the distance sensor 23, it is possible to detect a position of the vehicle relative to a specified point of passage by dead-reckoning navigation or to allocate the vehicle position to a point on the road by map matching between a running trace and the road data stored in the map data memory 3. The GPS device 14 receives the radio waves sent from a plurality of artifical satellites constituting a global positioning system and calculates an absolute position of the vehicle and a time based on the received information. The vehicle position detecting unit 2 is required to detect either one of the relative vehicle position determined by the dead-reckoning navigation or the absolute vehicle position determined by the GPS.

The system bus line 9 is also connected to an input device 15. When the navigation system is mounted on the vehicle, a remote control keyboard or the like is used as the input device 15. It is possible to designate various information, including a geographic point, by way of the input unit 15 for using the route search function of the navigation system.

The map data memory 3 includes a CD-ROM disk 20 as a replaceable storage medium, a CD-ROM driver 21 for optically reading the data stored in the CD-ROM disk 20 and a CD-ROM decoder 22 for converting data thus stored and read into the data that can be handled by the processing unit 1. The CD-ROM disk 20 has stored therein data on the roads as the network information combining nodes and links. Other optical disks such as the a DVD-ROM, a magnetic disk or a magnetic tape can also be used as are cording medium. General information stored for the nodes include position coordinates, the identification of junctions, a list of connection links and a list of connection nodes, names of intersections, and no-left-turn or no-right-turn information. The information stored for the links, on the other hand, includes road types, road width, traffic control information such as one-way passage and a speed limits, tunnel attributes, bridge attributes, toll road attributes, and road names. According to this embodiment, the node information also include the presence or absence of traffic lights.

The display unit 4 displays an image on the screen of a display device 23 such as a liquid crystal display (LCD) or a cathode ray tube (CRT) under the control of a display controller 24. The graphic controller 25 uses the data plotted in a graphic memory 26 for forming all of the images displayed, including a graphic image such as a road map.

FIG. 2 shows a system configuration of a route guide apparatus based on the hardware shown in FIG. 1. The processing unit 1 includes a route search unit 30 based on the programmed operation of the CPU 6 of FIG. 1, a guide point detecting unit 31, a guidance output point detecting unit 32 an d a traffic light counting unit 33. The route search unit 30 searches for an optimum guide route from the starting point to the destination input by way of the entered unit 15 or the like, shown in FIG. 1, as to meet specified conditions such as intermediate points to be passed. Intersections where the traveling direction is to be changed, entrances/exits and toll gates of toll roads, and other obscure points, are set as guide points on the guide route being searched for. The guide points can be set automatically based on preset conditions or can be designated by the user through the input unit 15. At a guide point more detailed drive guide information is supplied using a guide output unit such as the display unit 24 or the voice output device 5.

The guide point detecting unit 31 detects a guide point on which guidance is next to be supplied on the basis of the vehicle position received from the vehicle position detecting unit 2 and the road network information issued from the map data memory 3. The drive guidance at a guide point must be supplied before reaching a related guidance output point. The guidance output point is a point before the guide point on the guide route detected by the guidance output point detecting unit 32. The guidance output point is detected in terms of a predetermined distance from a related guide point or in terms of a predetermined predicted time length required before arrival at the guide point. In the case of detection based on the predicted time length required before arrival, the distance varies depending on the traveling speed of the vehicle.

Upon detection of a guidance output point, the traffic light counting unit 33 counts the number of traffic lights existing on the guide route from the guidance output point to a related guide point. In the process, the traffic light counting unit 33 detects the intersections existing on the guide route before reaching the guide point from t he road network information stored in the map data memory 3, checks for the presence or absence of a traffic light for each intersection, and counts the number of intersections installed with a traffic light as the number of traffic lights. As an alternative, the number of traffic signals installed up to a guide point is counted, and a point where the number of traffic lights reaches a predetermined value can be detected as a guidance output point. Upon detection of a guidance output point, the drive guide information of a guide point is supplied from a guidance output unit such as a voice output device 5 shown in FIG. 1.

FIG. 3 shows the programmed operation of the processing unit 1 according to the embodiment shown in FIG. 1. The operation starts at step a1 upon turning on a power switch 19. Step a2 and subsequent steps are operations to be repeated. At step a2, a vehicle position detected by the vehicle position detecting unit 2 is acquired through the system bus line 9. At step a3, whether or not the vehicle position is on the guide route is determined. If it is determined that the vehicle position is out of the guide route, the route guidance at the guide point becomes meaningless and is suspended, and the process returns to step a2. If it is determined that the vehicle position is on the guide route at step a3, whether or not the vehicle has reached the guidance output point is determined at step a4. If the vehicle has not reached the guidance output point, the process returns to step a2. If it is determined at step a4 that the vehicle has reached the guidance output point, the number of traffic lights from the vehicle position to the guide point is counted at step a5, and the guidance based on the number of traffic lights is outputted at step a6 from the guidance output unit.

FIG. 4 shows an example of a display guide screen 40 among the guidance outputs which are made together with the voice output by the voice output device 5 at step a6 in FIG. 3. The display guide screen 40 includes a map display 41 for indicating the guidance with respect to the road map and the vehicle position, a traffic light number guide part 42 for indicating the number of traffic lights leading up to the guide point, and a distance guide part 43 for indicating the distance up to the guide point. Though the distance guide part 43 is not necessarily provided, the distance up to the guide point, as well as the number of traffic lights, will facilitates the prediction of the density of and intervals between the intersections, thereby making it possible to recognize the guide point more accurately.

FIGS. 5A and 5B shows examples of the map display 41 of FIG. 4. A guide point 50 is set on a road 51. The road 51 intersects, for example, four roads 52, 53, 54, 55. The guide point 50 is set at an intersection where the direction change is required from a guide route 56 on the road 51 to a guide route 57 on the road 55. Since a vehicle at position 60 is on the road 51, three intersections 61, 62, 63 with the roads 52, 53, 54, respectively, are passed before reaching the guide point 50, and the guide point 50 is also an intersection, so there are four intersections from the vehicle position 60 to the guide point 50. A guidance output point is set 600 mm before the guide point 50.

FIG. 5A shows a case in which all the intersections 61, 62, 63 between the vehicle position 60 and the guide point 50 have a traffic light. In this case, a voice guidance such as "Turn to the right at the fourth traffic light about 600 m ahead" is issued from the voice output device 5 of FIG. 1, while at the same time displaying a map display 41a as the map display 41 on the display guide screen 40 as shown in FIG. 4. FIG. 5B shows a case in which the guide point 50 does not have a traffic light, although all the intermediate intersections 61, 62, 63 between the vehicle position 60 and the guide point 50 are installed with traffic lights. The voice output device 5 issues a voice guidance as "Turn to the right after passing the third traffic light about 600 m ahead" while at the same time displaying a map display 41b as the map display 41 in FIG. 4.

The presence or absence of a traffic light at each intersection can be more easily recognized by displaying a traffic light icon 70 at each intersection installed with a traffic light as in FIGS. 5A and 5B. Also, the voice guidance supplied at the guidance output point can also include such information on the guide point 50 as a command to turn to the left or right at the particular guide point which may be an intersection, an entrance/exit of a toll road or an express-highway.

The invention may be embodied in other specific forms without departing from the spirit or essential characteristics thereof. The pre sent embodiments are, therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A route guide apparatus for a vehicle, for supplying guidance relating to a guide point on a guide route, while detecting a vehicle position and referring to road network information, the route guide apparatus comprising:

a guidance output point detecting unit for detecting whether or not the vehicle position has reached a guidance output point set before the guide point on the guide route;

a traffic light counting unit for counting a number of traffic lights existing along the guide route from the vehicle position to the guide point based on the road network information and information as to a presence or absence of traffic lights at respective locations on the guide route; and a guidance output unit for supplying the guidance related to the guide point using the number of traffic lights counted by said traffic light counting unit when said guidance output point detecting unit detects that the vehicle position has reached the guidance output point.

2. The route guide apparatus of claim 1, wherein the road network information is stored in the form of a set of nodes representing coordinate points and links connecting the nodes, the route guide apparatus further comprising:

a display unit for displaying a road map based on the road network information and the vehicle position in relation to each other; and a route search unit for searching for the guide route to a destination with reference to the road network information in accordance with a predetermined condition.

3. The route guide apparatus of claim 1, wherein said guidance output point detecting unit detects that the vehicle has reached the guidance output point based on a distance to the guide point.

4. The route guide apparatus of claim 3, wherein the road network information is stored in the form of a set of nodes representing coordinate points and links connecting the nodes, the route guide apparatus further comprising:

a display unit for displaying a road map based on the road network information and the vehicle position in relation to each other; and a route search unit for searching for guide route to a destination with reference to the road network information in accordance with a predetermined condition.

5. The route guide apparatus of claim 1, wherein said guidance output point detecting unit detects that the vehicle has reached the guidance output point based on an estimated time length to reach the guide point.

6. The route guide apparatus of claim 5, wherein the road network information is stored in the form of a set of nodes representing coordinate points and links connecting the nodes, the route guide apparatus further comprising:

a display unit for displaying a road map based on the road network information and the vehicle position in relation to each other; and a route search unit for searching for the guide route to a destination with reference to the road network information in accordance with a predetermined condition.

7. The route guide apparatus of claim 1, wherein said guidance output unit indicates of the number of traffic lights up to the guide point by displaying an image.

8. The route guide apparatus of claim 1, wherein said guidance output unit indicates by voice the number of traffic lights to the guide point.

9. The route guide apparatus of claim 8, wherein said guidance output unit indicates the number of traffic lights to the guide point by displaying an image.

10. The route guide apparatus of claim 1, further comprising a distance detecting unit for detecting a distance from the guidance output point to the guide point, wherein said guidance output unit further includes the distance detected by said distance detecting unit in the guidance.

11. The route guide apparatus of claim 1, further comprising a guide information detecting unit for detecting guide information at the guide point, wherein said guidance output unit further includes the guide information detected by said guide information detecting unit in the guidance.

12. The route guide apparatus of claim 1, further comprising a setting unit for presetting a condition for detecting the guidance output point by said guidance output point detecting unit and for presetting a method for outputting the guidance by the guidance output unit.

13. A route guide apparatus for a vehicle, for supplying guidance relating to a guide point on a guide route, while detecting a vehicle position and referring to road network information, the route guide apparatus comprising:

a traffic light counting unit for counting a number of traffic lights existing along the guide route from the vehicle position to the guide point based on the road network information and information as to a presence or absence of traffic lights at specific locations on the guide route;

a guidance output point detecting unit for detecting whether or not the vehicle position has reached a guidance output point set before the guide point by a predetermined number of traffic lights, based on the number of traffic lights counted by said traffic light counting unit; and a guidance output unit for supplying the guidance relating to the guide point using the number of traffic lights when said guidance output point detecting unit detects that the vehicle position has reached the guidance output point.

14. The route guide apparatus of claim 13, wherein the road network information is stored in the form of a set of nodes representing coordinate points and links connecting the nodes, the route guide apparatus further comprising:

a display unit for displaying a road map based on the road network information and the vehicle position in relation to each other; and a route search unit for searching for the guide route to a destination with reference to the road network information in accordance with a predetermined condition.

15. The route guide apparatus of claim 13, wherein said guidance output unit indicates the number of traffic lights up to the guide point by displaying an image.

16. The route guide apparatus of claim 13, wherein said guidance output unit indicates by voices the number of traffic lights before to the guide point.

17. The route guide apparatus of claim 13, wherein said guidance output unit indicates the number of traffic lights to the guide point by displaying an image.

18. The route guide apparatus of claim 13, further comprising a distance detecting unit for detecting a distance from the guidance output point to the guide point, wherein said guidance output unit further includes the distance detected by said distance detecting unit in the guidance.

19. The route guide apparatus of claim 13, further comprising a guide information detecting unit for detecting guide information at the guide point, wherein said guidance output unit further includes the guide information detected by said guide information detecting unit in the guidance.

20. The route guide apparatus of claim 13, further comprising a setting unit for presetting a condition for detecting the guidance output point by said guidance output point detecting unit and for presetting a method for outputting the guidance by the guidance output unit.

\* \* \* \* \*